(12) United States Patent
Sigel

(10) Patent No.: US 7,628,966 B1
(45) Date of Patent: Dec. 8, 2009

(54) METHOD FOR SCRUBBING NATURAL GAS

(75) Inventor: Michael Wayne Sigel, Marion, KS (US)

(73) Assignee: American Energies Corporation, Inc., Wichita, KS (US)

( * ) Notice: Subject to any disclaimer, the term of this patent is extended or adjusted under 35 U.S.C. 154(b) by 814 days.

(21) Appl. No.: 10/786,715

(22) Filed: Feb. 24, 2004

Related U.S. Application Data

(60) Provisional application No. 60/450,256, filed on Feb. 25, 2003.

(51) Int. Cl.
*B01D 53/48* (2006.01)
(52) U.S. Cl. .................................. 423/225; 423/230
(58) Field of Classification Search ................ 423/225, 423/230
See application file for complete search history.

(56) References Cited

U.S. PATENT DOCUMENTS 5,658,541 A * 8/1997 Matros et al. ................ 423/210
5,858,212 A * 1/1999 Darcy ..................... 208/208 R \* cited by examiner

*Primary Examiner*—Edward M Johnson
(74) *Attorney, Agent, or Firm*—Robert O. Blinn

(57) ABSTRACT

The present invention is a process for removing hydrogen sulfide gas from natural gas by contacting a flow of sour natural gas containing hydrogen sulfide gas with a scavenging agent including a group IIA metal hydroxide such as calcium hydroxide for a sufficient amount of time to form calcium sulfide and water to yield natural gas that is substantially depleted of hydrogen sulfide gas. Sour natural gas may be percolated through a column containing a scavenging agent such as calcium hydroxide suspended as a fine particulate in water or a bed of dry calcium hydroxide granules. The scavenging agent may be periodically or continuously replenished with fresh scavenging agent rich in the selected group IIA metal hydroxide.

3 Claims, 3 Drawing Sheets

METHOD FOR SCRUBBING NATURAL GAS

CROSS REFERENCES TO RELATED APPLICATIONS

This application claims the benefit of U.S. Provisional Patent Application No. 60/450,256 filed Feb. 25, 2003.

FIELD OF THE INVENTION

This invention relates to an apparatus and a method for removing harmful acid gases such as hydrogen sulfide gas from natural gas.

BACKGROUND OF THE INVENTION

Natural gas is an abundant, natural source of fuel. However, natural gas may be found with harmful concentrations of hydrogen sulfide gas. Hydrogen sulfide ($H_2S$) gas is a corrosive, poisonous gas having a characteristic rotten-egg odor. It is usually found in natural gas between concentrations as low as 1 PPM to as much as 30% by volume. Natural gas having such unacceptable concentrations of $H_2S$, typically above 4 PPM is known as "sour" natural gas. A process for reducing natural gas $H_2S$ concentrations is known in the industry as "scavenging", "desulfurization" or "sweetening". The concentration of $H_2S$ in natural gas is regulated at a level below 4 PPM so that it can be shipped in the United States interstate pipeline network. Accordingly, what is needed is an efficient and inexpensive apparatus and method for removing or scavenging $H_2S$ from sour natural gas.

BRIEF DESCRIPTION OF THE INVENTION

In an embodiment of the present invention the aforementioned problem is addressed by providing an apparatus and method for scavenging hydrogen sulfide ($H_2S$) from sour natural gas. The hydrogen sulfide ($H_2S$) scavenging method of the present invention employs an extremely inexpensive scavenging agent that efficiently removes $H_2S$ and mercaptans from natural gas. The present method employs a column containing a Group IIA hydroxide which is most preferably calcium hydroxide [$Ca(OH)_2$]. Calcium hydroxide is extremely abundant and inexpensive. In the invention process, calcium hydroxide is preferably suspended in water as a slurry within a sweetening column. Natural gas containing hydrogen sulfide is sparged through the slurry through at least one sparge pipe which causes small bubbles of sour natural gas to come in contact with and react with the calcium hydroxide. This reaction yields calcium sulfide and water. Calcium sulfide is a harmless substance that has secondary industrial uses. The water by-product from the reaction causes a very slight and harmless increase in the amount of water in the slurry. Calcium hydroxide reacts with $H_2S$ with a very high degree of efficiency. The slurry may be removed and replaced when the calcium hydroxide is depleted.

The advantages of this process are substantial. Calcium hydroxide is abundant and inexpensive. Because calcium hydroxide is relatively inexpensive, a simple flushing process can be used to replace a depleted slurry rich in calcium sulfide with a fresh slurry rich in calcium hydroxide. Because the present apparatus and method makes it possible to remove hydrogen sulfide from natural gas at significantly reduced costs, it is now possible to exploit sour natural gas that has previously been deemed too rich in hydrogen sulfide for economical use.

DETAILED DESCRIPTION OF THE INVENTION

Figure 1:
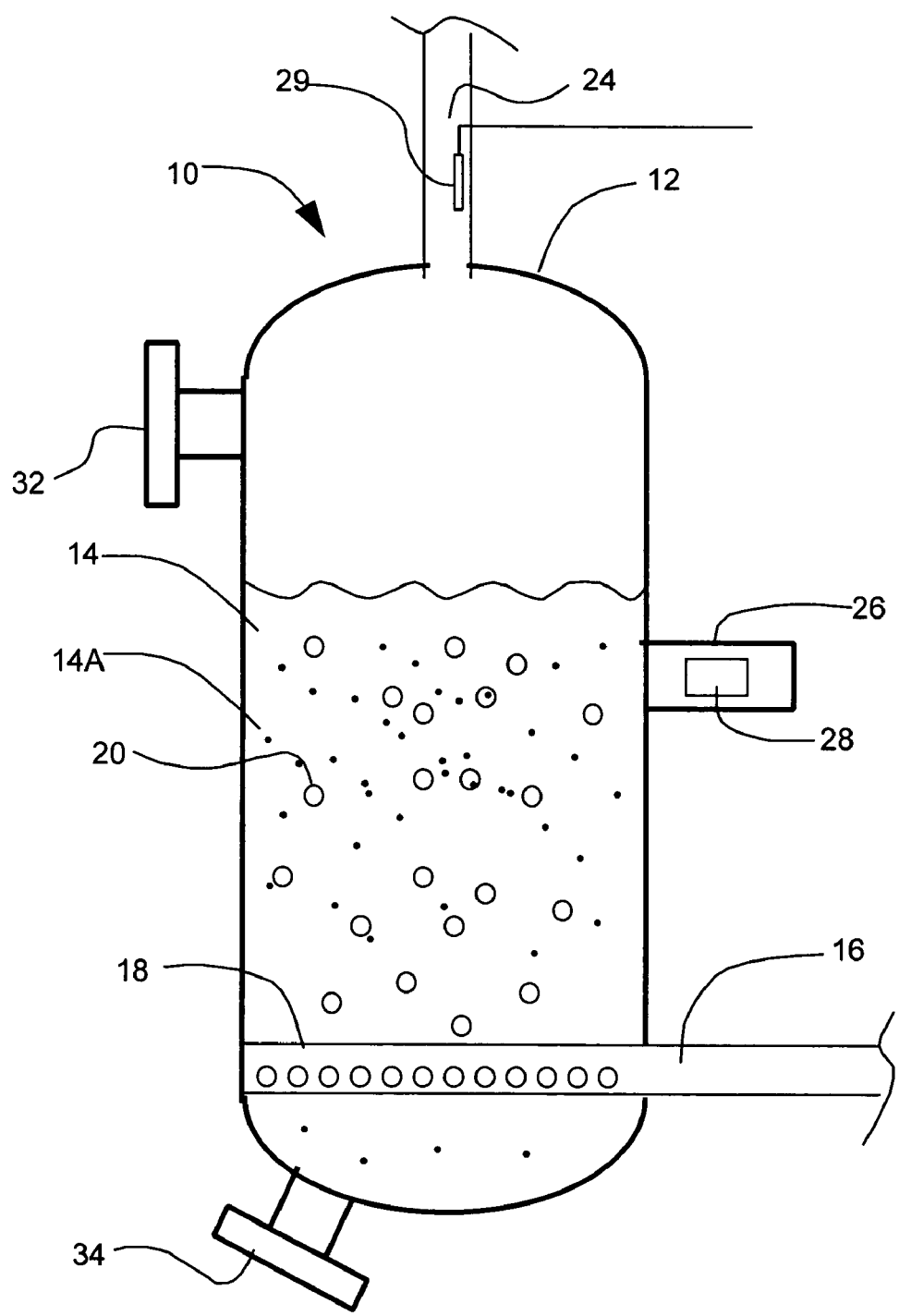
FIG. 1 is a diagram showing the process arrangement of the present invention employing a calcium hydroxide slurry.

Referring to the drawings, FIG. 1 illustrates an embodiment of a natural gas scrubbing apparatus 10 according to a first embodiment of the present invention used for conducting a hydrogen sulfide scavenging process. Apparatus 10 includes a column 12, at least one sparge pipe 16, a sweet gas outlet pipe 24, a flush inlet pipe 32 and a flush outlet pipe 34.

Column 12 contains a group II metal hydroxide scavenging agent which in FIG. 1 is illustrated as a slurry 14 of water having suspended fine particulate calcium hydroxide [$Ca(OH)_2$] 14A. In FIG. 1, a vast multitude of calcium hydroxide particles present in slurry 14 are represented schematically for ease of illustration by a relatively small number of points indicated by reference numeral 14A. It should be readily understood by those skilled in the art that significant quantities of fine particulate calcium hydroxide may be suspended in water. Column 12 is a gas tight vessel capable of maintaining slurry 14 and the natural gas at pressure sufficient to permit the natural gas to flow through column 12. Sparge pipe 16 penetrates the lower end of column 12. It serves as an inlet pipe for hydrogen sulfide laden natural gas for column 12. The portion of sparge pipe 16 that is inside column 12 has a multitude of holes 18 in its lower surface. Hydrogen sulfide ($H_2S$) laden natural gas flows through sparge pipe 16 and then out through holes 18 so that it can bubble up through slurry 14 as a very large multitude of gas bubbles 20. As gas bubbles 20 ascend in column 12, they encounter and react with calcium hydroxide particles 14A which react with the hydrogen sulfide portion of the natural gas to produce calcium sulfide which remains within column 12. Accordingly, sweet gas, no longer laden with significant amounts of hydrogen sulfide collects at the upper end of column 12 and exits through an outlet pipe 24 at the upper end of column 12.

FIG. 1 also illustrates an optional viewing port 26 for observing the color of slurry 14. Optional viewing port 26 includes an enclosed volume that communicates with slurry 14 in column 12. A window 28 in viewing port 26 and an opposite window (not shown) on the other side of viewing port 26 make it possible light to pass through the sample in viewing port 26 sot that an operator can see the color of slurry 14 in column 12. When slurry 14 has a high concentration of calcium sulfide and therefore needs to be replaced with fresh slurry, it exhibits a bluish-gray color which can be seen in window 28.

FIG. 1 further illustrates an optional hydrogen sulfide detector 29 for detecting hydrogen sulfide in gas leaving column 12. Such detectors may be easily obtained and are well know to those skilled in the art. Depletion of calcium hydroxide within slurry 14 is detected when hydrogen sulfide levels in the natural gas leaving column 12 begin increasing. Hydrogen sulfide detector 29 may also be linked with a communication device (not shown) for transmitting hydrogen sulfide levels thus providing a remote sensing capability for indicating the need for fresh slurry.

In a typical gas well application, a batch of slurry 14 will effectively absorb hydrogen sulfide from sour natural gas for several months before a large portion of the calcium hydroxide in the slurry has been converted to calcium sulfide. Accordingly, flush inlet pipe 32 and flush outlet pipe 34 are normally closed. They are opened when calcium sulfide rich used slurry is drained through flush outlet pipe 34 and fresh calcium hydroxide rich slurry is pumped in through flush inlet pipe 32. For example, in a typical application of the present apparatus and method, a column containing 500 gallons of slurry including 1000 lb. of fine particulate $Ca(OH)_2$ may receive 100 MCF (100,000 standard cubic feet) per day of sour natural gas having 2000 PPM $H_2S$ and produce that same quantity of natural gas at less than 4 PPM $H_2S$ for approximately 20 days before the $Ca(OH)_2$ in the slurry is approximately 70% depleted.

The method for using the apparatus shown in FIG. 1 would include the steps of first obtaining a column having an inlet sparge pipe at its base and an outlet pipe at its upper end and filling it with a slurry of water and a group IIA metal hydroxide such as preferably calcium hydroxide in a quantity and concentration sufficient to react with the hydrogen sulfide in a stream of hydrogen sulfide laden natural gas having a predetermined flow rate, secondly, sparging the hydrogen sulfide laden natural gas into the slurry within the column and receiving natural gas substantially depleted of hydrogen sulfide from the column through the outlet pipe at the upper end of the column. This method should also include, at least periodically, the additional steps of removing depleted slurry and replacing it with fresh slurry. Preferably, the steps of removing and replacing depleted slurry should be conducted when natural gas leaving the column has unacceptably high levels of hydrogen sulfide. As will be described in greater detail below, the steps of removing used slurry and replacing it with fresh slurry may be automated by operatively associating a hydrogen sulfide detector placed in the column outlet with a controllable means for adding fresh slurry and removing used slurry.

Figure 2:
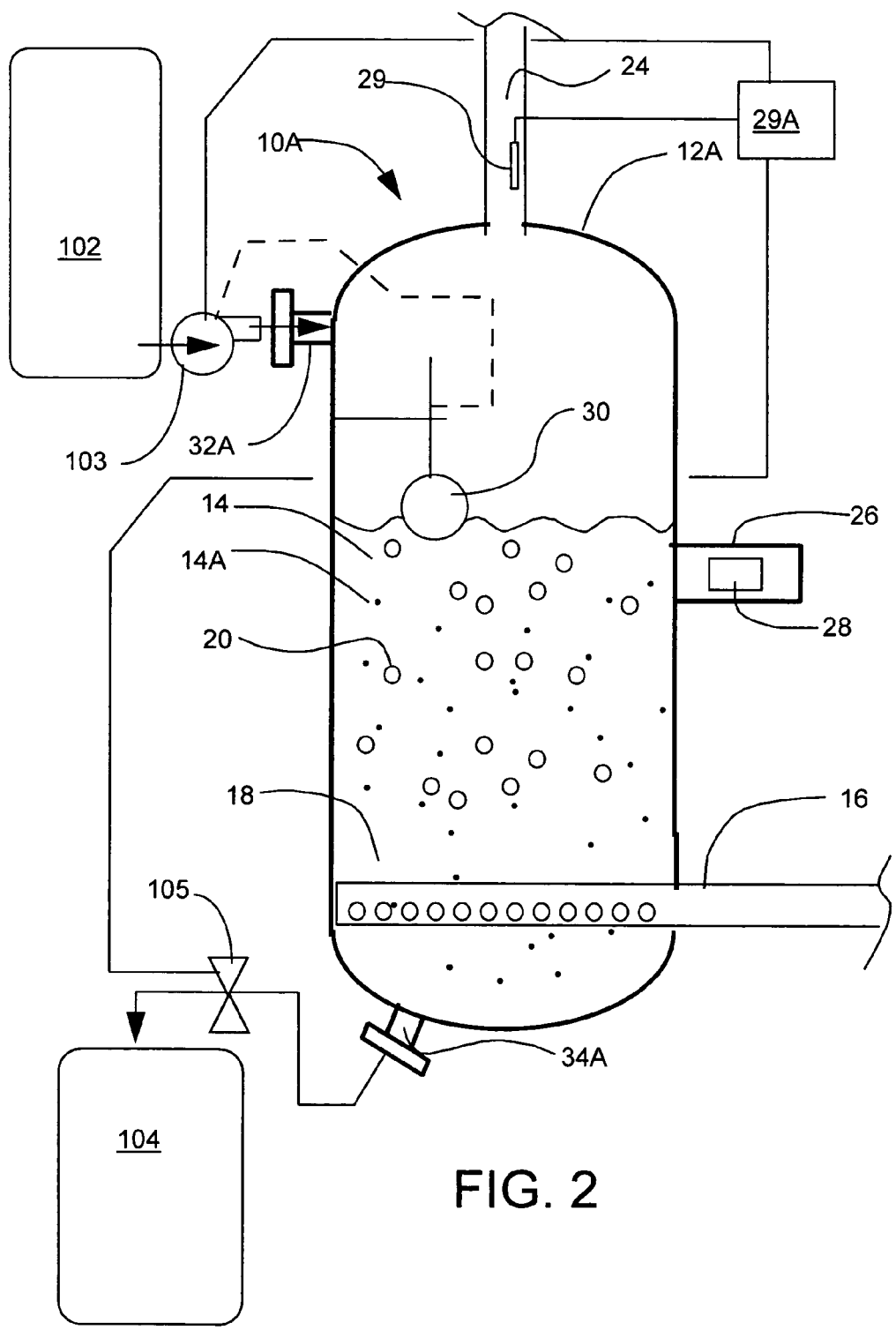
FIG. 2 is a diagram showing the process arrangement of the present invention employing a calcium hydroxide slurry and a means for continuously refreshing the calcium hydroxide slurry.

FIG. 2 illustrates an alternate apparatus 10A which includes an optional slurry replacement system for replacing used slurry with fresh slurry. Generally, this optional slurry replacement system operatively associates a hydrogen sulfide detector 29 with a controllable arrangement for adding fresh slurry and removing used slurry when the concentration of hydrogen sulfide in the natural gas leaving column 12A rises above a predetermined level. In FIG. 2, a pump 103 and a slurry injection pipe 32A communicates with a fresh slurry supply source 102. Pump 103 and injection pipe 32A provide a first controllable conduit for introducing fresh slurry into column 12A. Supply source 102 may be a tank of constantly agitated slurry or a device for formulating fresh slurry as needed. Also in FIG. 2, a slurry outlet pipe 34A communicates through a slurry release valve 105 with a used slurry collection vessel 104. Outlet pipe 34A and valve 105 provide a second controllable conduit for releasing used slurry from column 12A. With this arrangement, fresh slurry may be intermittently or continuously injected into column 12A from supply source 102 while relatively depleted slurry may be continuously or intermittently released by release valve 105 through slurry outlet pipe 34A for storage in used slurry collection vessel 104. With this approach, an operator maintaining apparatus 10A need only be concerned with occasionally re-supplying source 102 and occasionally emptying collection vessel 104. Preferably, the addition of fresh slurry and the removal of used slurry should be conducted to maintain a steady state balance of calcium hydroxide and calcium sulfide in column 12A. In most applications, where the sour natural gas stream has an average hydrogen sulfide concentration, a balance of 30% calcium hydroxide and 70% calcium sulfide is sufficient. Higher levels of calcium hydroxide may be required when a natural gas stream has relatively high concentrations of hydrogen sulfide gas. Because calcium hydroxide is plentiful and inexpensive, it is economically feasible to discard a slurry mixture having 30% calcium hydroxide. This is especially true if the slurry replacement system described above significantly reduces the labor needed to operate apparatus 10A.

The slurry replacement system described above has yet another important advantage. It is well known in the art that in some natural gas applications, column 12A may preferably operate with a significant internal pressure. Such internal pressures may run above 1000 PSI. Accordingly, it would be advantageous, in the case of relatively high pressure applications, to limit the diameter of column 12A as much as possible. This reduces the cost of fabricating column 12A and reduces the hazard of operating column 12A at a relatively high pressure. However, this places a severe limitation on the amount of slurry present in column 12A. In such an application, only relatively fresh slurry would be sufficient to remove hydrogen sulfide gas. The slurry replacement system described above makes it possible to operate a column with a small diameter and a relatively small internal volume while storing large quantities of fresh slurry and used slurry in relatively large, inexpensive, unpressurized vessels.

FIG. 2 further illustrates that hydrogen sulfide detector 29 may be linked to a control device 29A for controlling pump 103 and valve 105. With this control arrangement, fresh slurry may be automatically added when detector 29 detects an increase in the hydrogen sulfide in the natural gas leaving column 12A. A float type level detector 30 may also be used to actuate either pump 103 or valve 105 while control device 29A is used to operate whichever one of pump 103 or valve 105 that is not actuated by level detector 30. For a fully automatic system, it would be preferable to have a level sensor for column 12A, a first controllable conduit communicating between fresh slurry source 102 and column 12A, a second controllable conduit communicating between column 12A and collection vessel 104 and a control device such as control device 29A communicating with a hydrogen sulfide detector 29. In a fully automatic system, control device 29A would generally control the flow through the controllable conduits and thus the introduction of fresh slurry and the discharge of used slurry in response to hydrogen sulfide levels detected in natural gas leaving column 12A. Such a system would automatically converge on the optimum ratio of calcium hydroxide to calcium sulfide.

Figure 3:
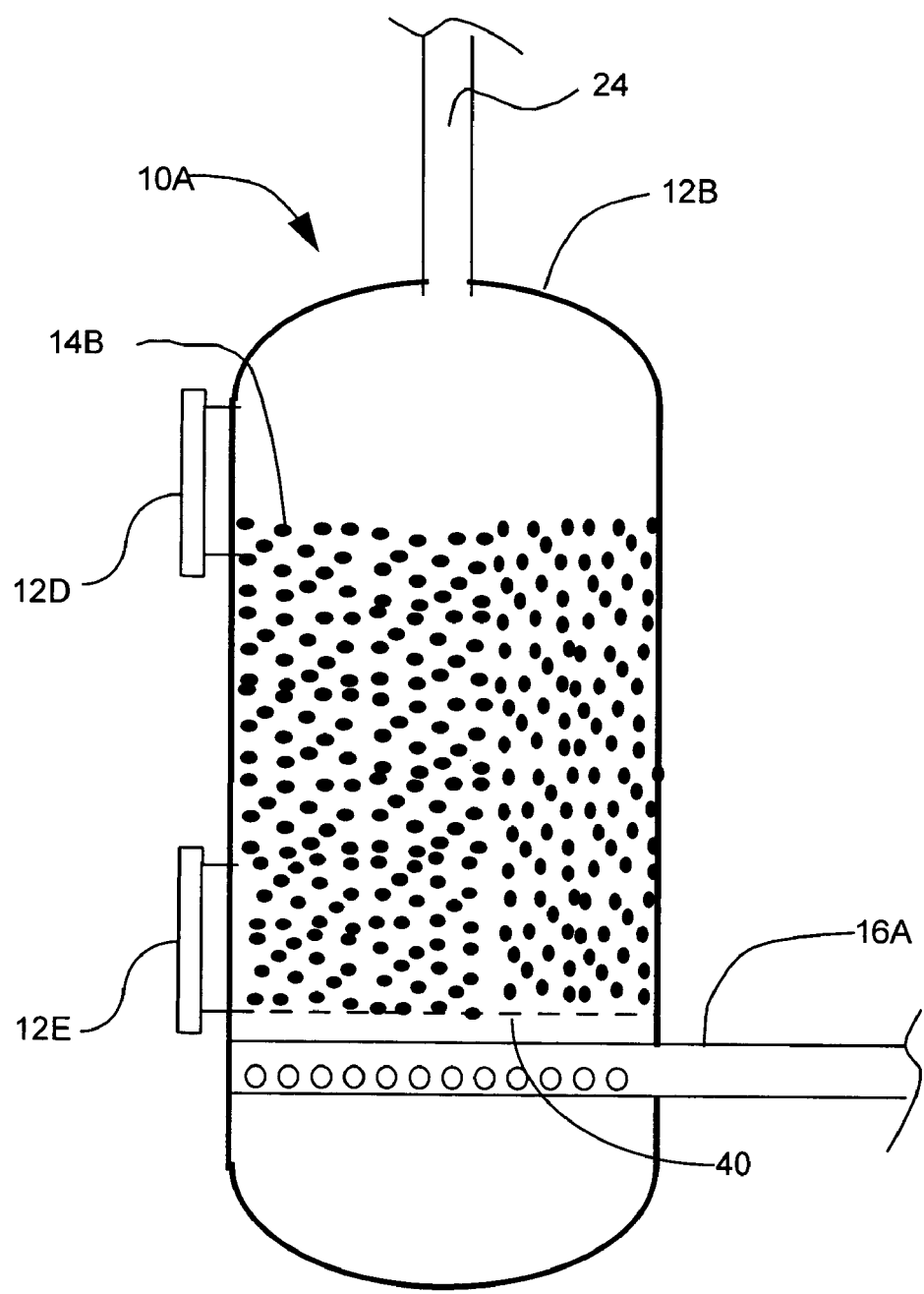
FIG. 3 is a diagram showing the process arrangement of the present invention employing dry calcium hydroxide granules.

FIG. 3 shows a second embodiment of the present apparatus and method in which the scavenging agent is not a slurry of water and a group II A metal hydroxide but a dry bed of group IIA hydroxide granules. FIG. 3 illustrates an apparatus 10A which preferably employs dry calcium hydroxide granules 14B within a dry column 12B. In FIG. 3, calcium hydroxide granules 14B may be supported by a perforated base 40. An inlet pipe 14B introduces hydrogen sulfide laden natural gas into a space below perforated base 40. Hatches 12D and 12E provide a means for adding and removing granules. As sour gas moves between the granules, hydrogen sulfide is removed as the granules gradually become rich in hydrogen sulfate. Granules 14B may be changed out all at once, or may be periodically removed from lower hatch 14E and replaced at upper hatch 14E. This placement of fresh granules near the top of the column and removal of used granules near the bottom of the column sets up a cross flow configurations in which hydrogen sulfide rich gas near inlet pipe 14B encounters granules relatively depleted of calcium hydroxide and hydrogen sulfide depleted gas toward outlet pipe 24 encounters granules relatively rich in calcium hydroxide.

The chemical reaction wherein hydrogen sulfide is removed from natural gas is shown in the following balanced equation:

$$Ca(OH)_2 + H_2S \rightarrow CaS + 2H_2O$$

Calcium hydroxide is a common substance, often referred to a slake lime or hydrated lime. It is a white solid at ambient temperatures and it is not soluble in water. Hydrogen Sulfide is a gas at ambient temperatures. Calcium sulfide is a blue gray solid at ambient temperature that is also not soluble in water.

As hydrogen sulfide laden gas percolates up through slurry 14 containing very small particles of calcium hydroxide, the hydrogen sulfide gas comes into intimate contact with the calcium hydroxide so that the above reaction can take place. Typically, sour natural gas feedstock contains hydrogen sulfide gas in amounts that are measured in parts per million. Because of this, a few pounds of calcium hydroxide can be used to sweeten many thousands of cubic feet of natural gas. A relatively small quantity of calcium hydroxide slurry, not exceeding two or three hundred gallons, in a column such as column 12 can be used to remove most of the hydrogen sulfide gas from feedstock generated by a typical gas well over a long period of time extending into several months.

As noted above, the above reaction could also be conducted by replacing calcium hydroxide with any other Group IIA metal hydroxide. However, calcium hydroxide is the most efficient and least costly of all the various Group IIA metal hydroxides. Still further suspending calcium hydroxide in a slurry with water seems to be the most effective way to formulate a scavenging agent.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A method for removing hydrogen sulfide gas from a stream of natural gas, comprising the following steps:
    (a) providing a column having an inlet at the base of said column and an outlet at the upper end of said column,
    (b) charging said column with a scavenging agent including a group IIA metal hydroxide,
    (c) introducing hydrogen sulfide laden natural gas into said inlet,
    (d) receiving natural gas from said outlet having a lower concentration of hydrogen sulfide than the natural gas entering said inlet,
    (e) sampling the natural gas leaving said column to determine the concentration of hydrogen sulfide, and,
    (f) removing used scavenging agent from said column and replacing said used scavenging agent with fresh scavenging agent if the concentration of hydrogen of sulfide gas in said natural gas leaving said column is above a predetermined level and continuing such replacement of used scavenging agent with fresh scavenging agent until the concentration of hydrogen sulfide in said natural gas leaving said column falls below a predetermined level.

2. The method of claim 1, wherein:
said group IIA metal hydroxide is calcium hydroxide.

3. The method of claim 1, further comprising the steps of:
    (a) providing a fresh scavenging agent supply source in communication with said column via a first controllable conduit,
    (b) providing a used scavenging agent collection vessel in communication with said column via a second controllable conduit,
    (c) providing a hydrogen sulfide detector for sensing the concentration of hydrogen sulfide in the natural gas leaving said column,
    (d) providing a control device in communication with said hydrogen sulfide detector, and,
    (e) operatively associating said control device with said first and second controllable conduits such that fresh scavenging agent is added to said column and used scavenging agent is removed from said column when said hydrogen sulfide detector detects a concentration of hydrogen sulfide above a predetermined level and such that the addition of fresh scavenging agent and the removal of used scavenging agent ceases when said hydrogen sulfide detector detects a concentration of hydrogen sulfide below a predetermined level.

* * * * *